United States Patent
Williams

(10) Patent No.: US 9,037,462 B2
(45) Date of Patent: *May 19, 2015

(54) USER INTENTION BASED ON N-BEST LIST OF RECOGNITION HYPOTHESES FOR UTTERANCES IN A DIALOG

(75) Inventor: Jason Williams, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 462 days.

This patent is subject to a terminal disclaimer.

(21) Appl. No.: 13/424,922

(22) Filed: Mar. 20, 2012

(65) Prior Publication Data

US 2012/0179467 A1    Jul. 12, 2012

Related U.S. Application Data

(63) Continuation of application No. 12/325,786, filed on Dec. 1, 2008, now Pat. No. 8,140,328.

(51) Int. Cl.
| | | |
|---|---|---|
| *G10L 15/14* | (2006.01) | |
| *G10L 15/183* | (2013.01) | |
| *G10L 15/22* | (2006.01) | |
| *G06F 17/27* | (2006.01) | |

(52) U.S. Cl.
CPC .............. *G06F 17/279* (2013.01); *G10L 15/22* (2013.01)

(58) Field of Classification Search
CPC ....... G10L 15/14; G10L 15/183; G10L 15/19; G10L 15/22; G06F 17/279
USPC ........................ 704/240, 256, 256.1, 275, 236
See application file for complete search history.

(56) References Cited

U.S. PATENT DOCUMENTS

| | | | |
|---|---|---|---|
| 5,712,957 A | 1/1998 | Waibel et al. | |
| 6,931,384 B1 * | 8/2005 | Horvitz et al. | 706/45 |
| 7,627,473 B2 * | 12/2009 | Gunawardana et al. | 704/250 |
| 7,725,409 B2 * | 5/2010 | Zhou et al. | 704/256.1 |
| 7,747,437 B2 | 6/2010 | Verhasselt et al. | |
| 7,881,926 B2 | 2/2011 | Joublin et al. | |
| 8,010,364 B2 | 8/2011 | Williams | |
| 8,140,328 B2 * | 3/2012 | Williams | 704/236 |
| 8,374,881 B2 * | 2/2013 | Bangalore et al. | 704/277 |
| 8,457,968 B2 * | 6/2013 | Williams | 704/257 |
| 8,660,844 B2 * | 2/2014 | Williams | 704/239 |

(Continued)

OTHER PUBLICATIONS

Williams et al., "Scaling POMDPs for Spoken Dialog Management", IEEE Transactions on Audio, Speech, and Language Processing, vol. 15, Issue 7, Sep. 2007, pp. 2116 to 2129.*

(Continued)

*Primary Examiner* — Martin Lerner

(57) ABSTRACT

Disclosed herein are systems, computer-implemented methods, and tangible computer-readable media for using alternate recognition hypotheses to improve whole-dialog understanding accuracy. The method includes receiving an utterance as part of a user dialog, generating an N-best list of recognition hypotheses for the user dialog turn, selecting an underlying user intention based on a belief distribution across the generated N-best list and at least one contextually similar N-best list, and responding to the user based on the selected underlying user intention. Selecting an intention can further be based on confidence scores associated with recognition hypotheses in the generated N-best lists, and also on the probability of a user's action given their underlying intention. A belief or cumulative confidence score can be assigned to each inferred user intention.

20 Claims, 6 Drawing Sheets

(56) References Cited

U.S. PATENT DOCUMENTS

| | | | |
|---|---|---|---|
| 8,694,324 B2* | 4/2014 | Di Fabbrizio et al. | 704/275 |
| 8,700,402 B2* | 4/2014 | Williams | 704/251 |
| 8,812,323 B2* | 8/2014 | Tong et al. | 704/251 |
| 8,914,294 B2* | 12/2014 | Di Fabbrizio et al. | 704/275 |
| 2003/0061029 A1* | 3/2003 | Shaket | 704/9 |
| 2003/0088412 A1 | 5/2003 | Shetty et al. | |
| 2004/0260543 A1 | 12/2004 | Horowitz et al. | |
| 2005/0165607 A1* | 7/2005 | Di Fabbrizio et al. | 704/256 |
| 2006/0020464 A1 | 1/2006 | Ju et al. | |
| 2006/0085190 A1 | 4/2006 | Gunawardana et al. | |
| 2006/0100874 A1* | 5/2006 | Oblinger et al. | 704/256.3 |
| 2006/0149555 A1* | 7/2006 | Fabbrizio et al. | 704/275 |
| 2007/0265849 A1 | 11/2007 | Grost et al. | |
| 2009/0030683 A1* | 1/2009 | Williams | 704/236 |
| 2009/0112586 A1 | 4/2009 | Williams | |
| 2009/0112598 A1 | 4/2009 | Williams | |
| 2009/0182559 A1 | 7/2009 | Gerl et al. | |
| 2010/0131260 A1* | 5/2010 | Bangalore et al. | 704/3 |
| 2010/0138215 A1* | 6/2010 | Williams | 704/9 |
| 2011/0010164 A1 | 1/2011 | Williams | |
| 2011/0054893 A1 | 3/2011 | Williams | |
| 2011/0099012 A1 | 4/2011 | Williams | |
| 2011/0131048 A1 | 6/2011 | Williams | |
| 2011/0137654 A1 | 6/2011 | Williams | |
| 2012/0232898 A1* | 9/2012 | Di Fabbrizio et al. | 704/235 |
| 2013/0151232 A1* | 6/2013 | Bangalore et al. | 704/2 |

OTHER PUBLICATIONS

Young et al., "The Hidden Information State Approach to Dialog Management", IEEE International Conference on Acoustics, Speech and Signal Processing, 2007, ICASSP 2007, Apr. 15-20, 2007, vol. 4, pp. IV-149-IV-152.

Williams et al., "Scaling Up POMDPs for Dialog Management: The 'Summary POMDP' Method", 2005 IEEE Workshop on Automatic Speech Recognition and Understanding, Nov. 27, 2005, pp. 250-255.

Zhu et al., "Spoken dialogue management as planning and acting under uncertainty", 2002 International Conference on Machine Learning and Cybernetics, 2002, Proceedings, Nov. 4-5, 2002, vol. 2, pp. 669-673.

* cited by examiner

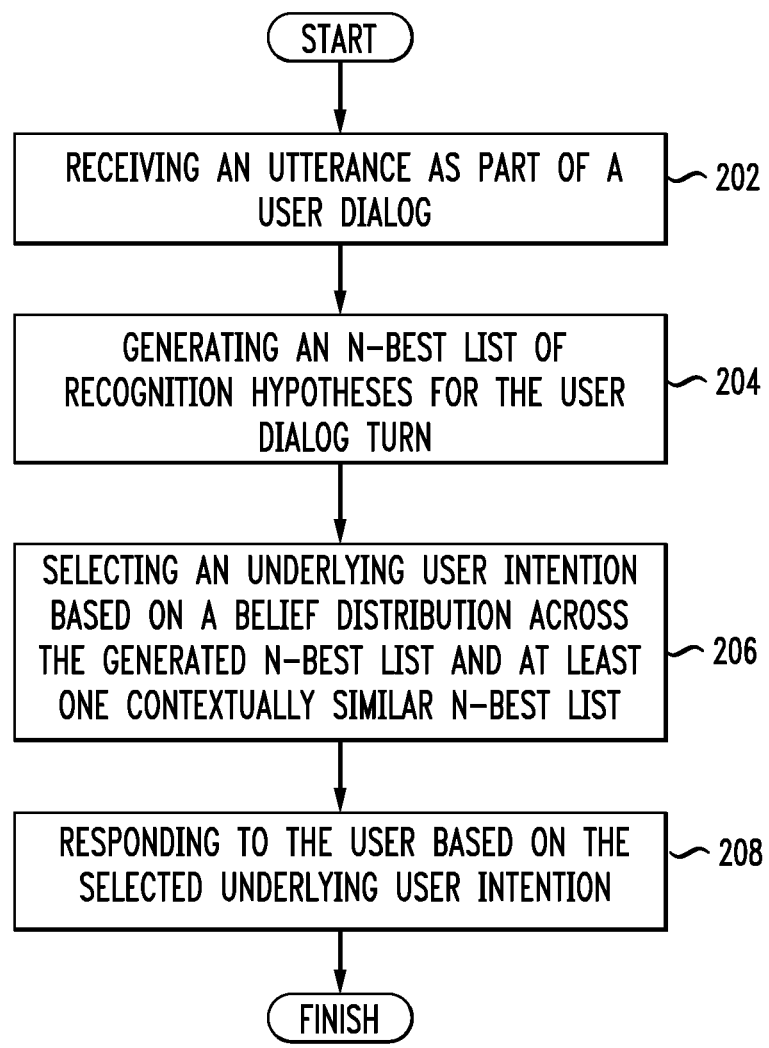

FIG. 3A

| N-BEST LIST #1 | N-BEST LIST #2 | N-BEST LIST #3 |
|---|---|---|
| 1. Tom | 1. Don | 1. Jones |
| 2. John | 2. Tom | 2. Doans |
| 3. Don | 3. Ron | 3. Jordan |

FIG. 3B

| N-BEST LIST #1 | N-BEST LIST #2 | N-BEST LIST #3 |
|---|---|---|
| 1. FOR (74%) | 1. FORD (65%) | 1. FORK (92%) |
| 2. FORT (56%) | 2. FORT (61%) | 2. FORT (72%) |
| 3. FORM (21%) | 3. FORKED (30%) | 3. FOR (28%) |

USER INTENTION BASED ON N-BEST LIST OF RECOGNITION HYPOTHESES FOR UTTERANCES IN A DIALOG

PRIORITY INFORMATION

The present application is a continuation of U.S. patent application Ser. No. 12/325,786, now U.S. Pat. No. 8,140,328, filed on Dec. 1, 2008 and issued on Mar. 20, 2012, the contents of which is incorporated herein in its entirety.

BACKGROUND OF THE INVENTION

1. Field of the Invention

The present invention relates to speech recognition and more specifically to using alternate recognition hypotheses for speech recognition.

2. Introduction

Despite decades of research and development, speech recognition technology is far from perfect and speech recognition errors are common. While speech recognition technology is not perfect, it has matured to a point where many organizations implement speech recognition technology in automatic call centers to handle large volumes of telephone calls at a relatively low cost. Such spoken dialog systems rely on speech recognition for user input. Recognition errors lead to misunderstandings that can lengthen conversations, reduce task completion, and decrease customer satisfaction.

As part of the process of identifying errors, a speech recognition system generates a confidence score. The confidence score is an indication of the reliability of the recognized text. When the confidence score is high, then recognition results are more reliable. However, the confidence score itself is not perfect and can contain errors. Even in view of these weaknesses, commercial dialog systems often use a confidence score in conjunction with confirmation questions to identify recognition errors and prevent failed dialogs. A speech recognition system can ask explicit or implicit confirmation questions based on the confidence score. If the confidence score is low, the system can ask an explicit confirmation question such as 'Did you say Nebraska?' If the confidence score is high, the system can ask an implicit confirmation question such as 'Ok, Nebraska. What date do you want to leave?' Explicit confirmations are more reliable but slow down the conversation. Conversely, implicit confirmations are faster but can lead to more confused user speech if incorrect. The confused speech can lead to additional difficulty in recognition and can lead to follow-on errors.

Some researchers attempt to spot bad recognitions using pattern classification. In these cases, a system provides a pattern classifier with the recognized text, the duration of the speech, the current dialog context, and other output from the speech recognizer. These approaches have been shown to identify errors better than using the confidence score alone. Accordingly, what is needed in the art is an improved way to perform speech recognition.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Many speech recognition techniques generate N-best lists, a list of likely speech recognition candidates. A speech recognition engine produces N-best lists which contain a certain number (N) ranked hypotheses for the user's speech, the top entry being the engine's best hypothesis. Often, when the top entry in an N-best list is incorrect, the correct entry is contained lower in the N-best list. Current dialog systems generally use the top entry and ignore the remainder of the entries in the N-best list.

Disclosed are systems, computer-implemented methods, and tangible computer-readable media for using alternate recognition hypotheses to improve whole-dialog understanding accuracy. The method includes receiving an utterance as part of a user dialog, generating an N-best list of recognition hypotheses for the user dialog turn, selecting an underlying user intention based on a belief distribution across the generated N-best list and at least one contextually similar N-best list, and responding to the user based on the selected underlying user intention. Selecting an intention can further be based on confidence scores associated with recognition hypotheses in the generated N-best lists, and also on the probability of a user's action given their underlying intention. A belief or cumulative confidence score can be assigned to each inferred user intention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2A illustrates a broad example method embodiment;
FIG. 3A illustrates 3 sample N-best lists;
FIG. 3B illustrates 3 sample N-best lists.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
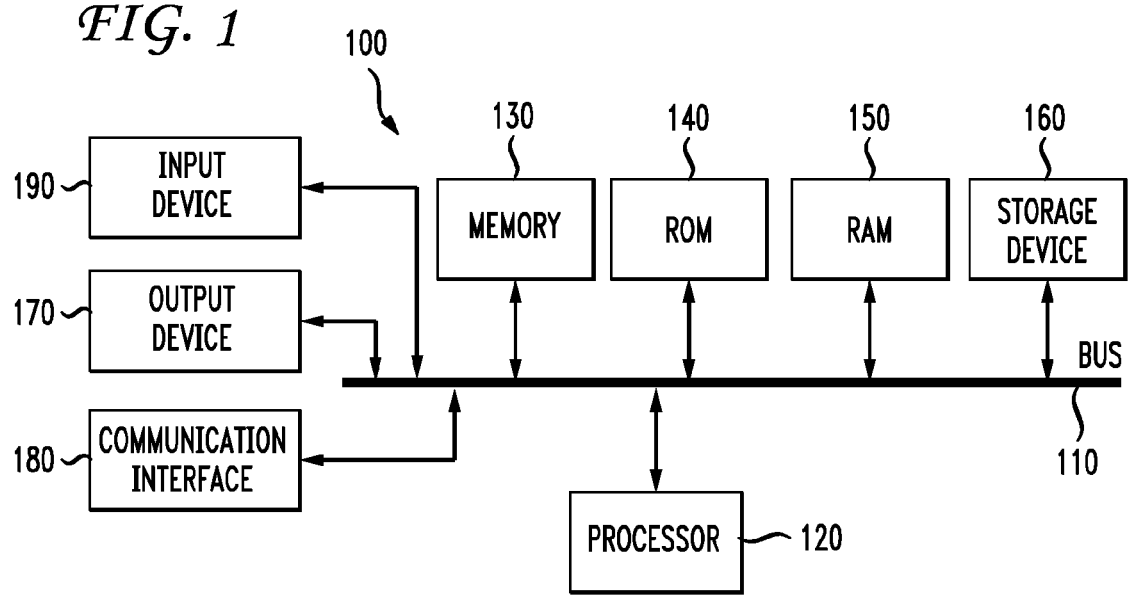
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2B:
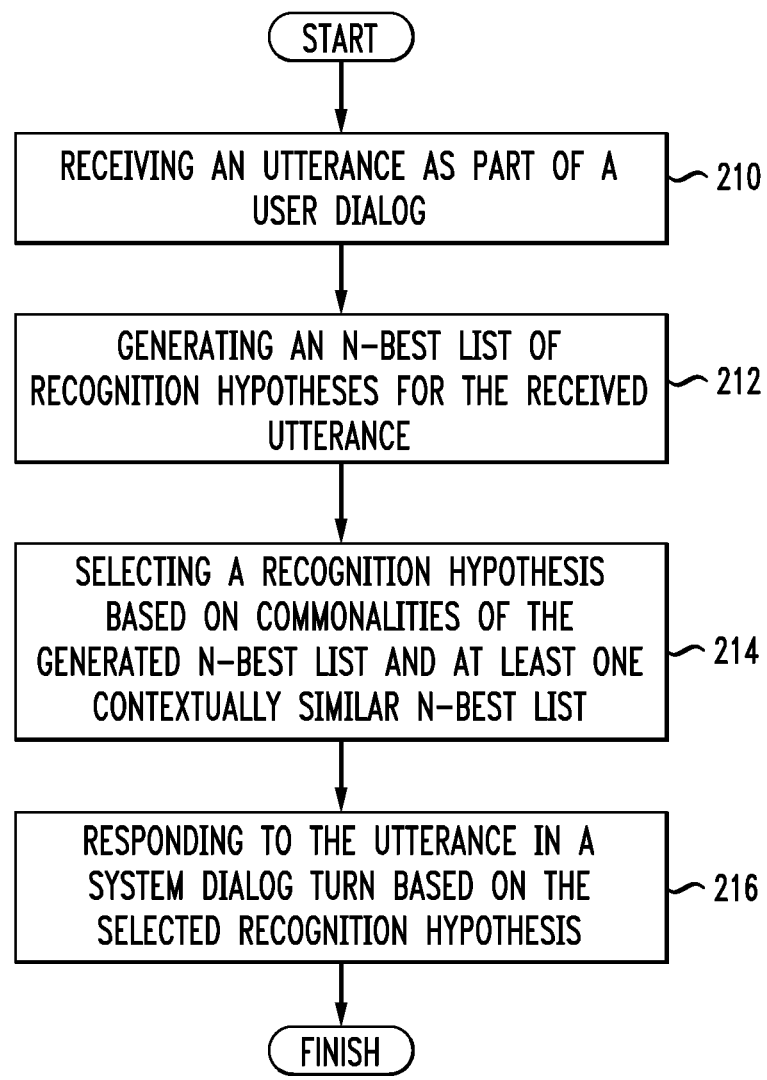
FIG. 2B illustrates an example method embodiment based on commonalities across N-best lists.

Having discussed some fundamental system elements, the disclosure turns to the example method embodiments as illustrated in FIGS. 2A and 2B. For simplicity, FIGS. 2A and 2B are discussed in terms of systems configured to practice the methods. At a high level, the method generates one or more N-best lists during speech recognition and uses one or more of the N-best lists to determine a hidden user intention. FIG. 2A illustrates a broad application of this principle. The system receives an utterance as part of a user dialog (202). One source of user dialogs is users interacting with an interactive voice response (IVR) system. Often user intentions are more complicated and detailed than the actual uttered words. When users converse with IVR systems, one objective of the system is to discern the hidden variable of the user's intent. Typically the user's intent is strewn in bits and pieces across multiple N-best lists. The user's intent can be thought of as having multiple slots. For example, a user's intention for ordering a pizza can include "slots" of size, price, delivery time, toppings, type of crust, and so forth. Individual N-best lists can contain information relating to some, all, or none of the slots representing the user's intention.

The system generates an N-best list of recognition hypotheses for the user dialog (204). Each N-best list is some observation about what the user wants. These N-best lists can represent different views into the hidden user intention, but each is a partial noisy view into the user intention. For example, in a dialog with the user, the system asks "What city are you flying to?" The user answers "From Boston to LA." The system generates an N-best list of possible departure and arrival cities. The system follows up with the question "When are you leaving?" The user answers "I want to be in LA by Tuesday at 4 p.m." The system generates an N-best list of flights that arrive in LA by Tuesday at 4 p.m. Each N-best list fills different slots in the hidden user intention. The system compares the N-best lists to find the most likely combination which represents the hidden user intent.

Then the system selects an underlying user intention based on a belief distribution across the generated N-best list and at least one contextually similar N-best list (206) and responds to the user based on the selected underlying user intention (208).

In another example, the system generates N-best lists of first names and last names during a dialog. The system can compare the N-best lists to a names directory to determine which combination of N-best list entries is most likely to represent the user's intention. In one example, a first N-best list contains first names (such as Bryant, Bryan, Ryan) and a second N-best list contains last names (such as Milani, Mililani, Miani). These N-best lists are contextually similar because they each relate to different parts of the same name. Similarly, the system can generate pairs of N-best lists for city names and state names. The system can compare the pairs of N-best lists to a directory of city and state names to determine which combination is the most likely.

FIG. 2B illustrates a specific, non-limiting application of the principles described in FIG. 2A which is based on commonality in N-best lists. A best item may be an item that appears near the top of the list consistently across multiple N-best lists. This method can be applied to situations where the top item in an N-best list is incorrect or when the top item has a low confidence score. Often when the top entry is incorrect, the lower part of one of the N-best lists contains the correct entry. Previous systems in the art could only identify that a recognition error occurred, but not correct it. This disclosure teaches an approach to correct the errors using the non-top items in N-best lists. The challenge is to determine how much trust to place in the top item in an N-best list as opposed to an item that occurs multiple times across multiple N-best lists. This disclosure leverages the high probability that the lower parts of the list contain the correct answer when the top item is incorrect. The system receives an utterance as part of a user dialog (210). One example application is a natural language phone menu where the system prompts and user answers fit within a narrow framework of possibilities. Another example application is a more free form natural language interface. Often, even in a free form language interface, users ask the same or contextually similar questions. The system generates an N-best list of recognition hypotheses for the received utterance (212). The system can also simultaneously generate multiple N-best lists using different speech recognition engines, different grammars, and so forth.

The system selects a recognition hypothesis based on commonalities of the generated N-best list and at least one contextually similar N-best list (214). In one aspect, the system selects a recognition hypothesis based further on confidence scores associated with recognition hypotheses in the generated N-best list and the at least one contextually similar N-best list. The system can calculate confidence scores by summing over all possible hidden states and hidden user actions. The system can assign an individual confidence score to each recognition hypothesis in the generated N-best list and in the at least one contextually similar N-best list. Confidence scores can be operative over a whole dialog. In one aspect, the system does not consider recognition hypotheses in each of the plurality of contextually similar N-best lists with confidence scores below a threshold when selecting the recognition hypotheses.

The system can calculate the confidence score by summing all possible hidden states and hidden user actions, such as in a hidden Markov model. The system can further assign a confidence score to each item in each of the plurality of N-best lists. The confidence score can reflect an automatic speech recognition (ASR) certainty in the recognized speech.

For example, in an N-best list containing the words 'Boston' and 'Austin', the system can assign a confidence score reflecting the probable accuracy of the recognition, such as 'Austin: 81%' and 'Boston:43%'. The system can remove from consideration those items in each of the plurality of N-best lists with confidence scores below a threshold when selecting the item. One example of a threshold is culling a long N-best list down to a maximum of 4 entries. Another example of a threshold is culling those entries in an N-best list which have a confidence score under 30%. Yet another example of a threshold is to remove the bottom ⅔ of the N-best list. Other thresholds and combinations of thresholds are possible. The system can preserve confidence scores so they are operative over a whole dialog. For example, if the same or similar question is asked several times, the system can aggregate confidence scores from previously generated N-best lists. The system can calculate the probability of the user action by iterating over each user action to form a distribution over the user's real intentions at each dialog turn and by assimilating the distribution in each of the plurality of N-best lists.

In one aspect, the system selects a recognition hypothesis based further on a probability of a user action. The system can calculate the probability of the user action by iterating over each user action to form a distribution over the user's real intentions at each dialog turn and by assimilating the distribution in each of the plurality of contextually similar N-best lists. Finally, after the system selects a recognition hypothesis, the system responds to the utterance in a system dialog turn based on the selected recognition hypothesis (216).

FIG. 3A illustrates 3 sample N-best lists representing portions of a first and last name combination. While these lists each contain three words, N-best lists have no effective limits on the number of items except that an N-best list must contain at least one item. The leftmost and middle N-best lists in FIG. 3A show different recognition hypotheses for recognizing the first name 'Tom'. The top position for both N-best lists is different (Tom, Don). A traditional approach only looks to the top of an N-best list. In this case, the top of the center N-best list is wrong. Regardless, the system moves on to the rightmost N-best list which shows recognition hypotheses for last names. The system can form a belief distribution over the contextually similar N-best lists based on a directory of likely names for this domain, such as a company directory or a personal contacts list. The system then selects an underlying user intention based on the belief distribution and responds to the user based on the selected user intention.

FIG. 3B illustrates 3 sample N-best lists representing a single word. While these lists each contain three words, N-best lists have no effective limits on the number of items except that an N-best list must contain at least one item. The N-best lists in FIG. 3B show different recognition hypotheses and confidence scores in parentheses for recognizing the spoken word 'fort'. The top position for each of the three N-best lists is different (for, ford, fork). A traditional approach only looks to the top of an N-best list. In this case, the top of each N-best list is wrong. According to the principles described herein, a system looks at the N-best lists as a group and identifies that the word 'fort' is in the second position in each N-best list with a reasonably high confidence score and that the tops of each list do not agree. In this case, the system selects the second position 'fort' because its consistently high confidence scores and consistent high placement in the N-best lists outweighs the individual conflicting tops of the N-best lists. In other words, the system places a higher trust in 'fort' than in 'for', 'ford', or 'fork'. However, even if 'fort' had appeared in the second position in each N-best list but had a lower confidence score and if 'ford' occupied the top position with an extremely high confidence score in two of the three lists, then the system can place higher trust in 'ford' and select 'ford' as the correct item. One possible way to analyze and interpret this data is to average the confidence scores of each word in all of the N-best lists. Given the data in FIG. 3, the average of the word 'for' is (0.74+0+0.28)/3=0.51. The average for the word 'fort' is (0.56+0.61+0.72)/3=0.63. The average for the word 'form' is (0.21+0+0)/3=0.07. The average for the word 'ford' is (0+0.65+0)=0.217. The system can assign a reduced average for groupings of similar words, such as 'fork' and 'forked'. In this example, the average for the word 'forked' and 'fork' is (0+0.30*0.66+0.92)=0.559. A reduction factor, 0.66, reduces the certainty of 'forked' because it is similar to, but not the same as, 'fork', possibly indicating a poor recognition. If the system uses this approach, it selects 'fort' even though it is not the top of any N-best list because 'fort' has the highest average confidence score of any entry in all three lists. This simple averaging scheme is exemplary. Those of skill in the art will recognize other, more detailed, and/or advanced methods for determining which entry in the N-best list is the most correct.

Now the disclosure turns to a more in depth description of the mechanics of tracking multiple dialog states, an example model of an N-best list, a dataset used for evaluation, the actual evaluation, and results.

The mechanics of tracking multiple dialog states broadly follows a spoken dialog system partially observable Markov decision process (SDS-POMDP) model. At each turn, the dialog is in some hidden state S which cannot be directly observed by the dialog system. The state S includes the user's complete goal, such as creating a travel itinerary from London to Boston on June 3. The state S can also include a dialog history such as confirmed information slots.

The dialog system takes a speech action "a", saying "Where are you leaving from?" Speech action "a" transitions the hidden dialog state "s" to a new dialog state s' according to a model P(s'|s,a). The user responds with action u', saying "Boston", according to a model P(u'|a',s). The user's action is also not directly observable by the dialog system. The speech recognition engine processes u' to produce an N-best list ũ and other recognition features "f" such as a confidence score, likelihood measures, or any other features for each entry in ũ, according to a model p(ũ',f|u'). For example, ũ' can be an N-best list with 2 entries, where the first entry is "AUSTIN" and second entry "BOSTON". The value f can be a confidence score of 73 for this recognition result.

The true state of the dialog s is not directly observed by the dialog system, so the dialog system tracks a distribution over dialog states b(s) called a belief state, with initial belief $b_0$. At each time-step, the system updates b by summing over all possible hidden states and hidden user actions:

$$b'(s') = \eta \cdot \sum_{u'} p(\tilde{u}', f' | u') P(u' | s', a) \sum_{s} P(s' | s, a) b(s)$$

where η is a normalizing constant that ensures b'(s') is a proper probability.

Eventually, the dialog system commits to a particular dialog state to satisfy the user's goal, such as printing a ticket or forwarding a phone call. The dialog state with the highest probability is called s*. The system computes s* as $$S^* = \operatorname*{argmax}_{s} b(s)$$

with its corresponding probability being $b^* = \max_s b(s)$. The value b* indicates the probability that s* is correct given all of the system actions and N-best lists observed so far in the current dialog.

The system uses the belief state b to select at run-time an action using some policy π: b→a, and improvements over traditional methods have been reported by constructing the policy using a wide variety of methods, including POMDPs, decision-theory, or by hand crafting.

Past work on estimating p(ũ,f|u) has been limited to a 1-Best list. A better way is to estimate p(ũ,f|u) for a full N-best list. By extending ũ from 1-Best to N-best s* more often corresponds to the correct dialog state.

An N-best list is defined as $\tilde{u}=[\tilde{u}_1, \ldots, \tilde{u}_N]$ where each $\tilde{u}_n$ represents an entry in the N-best list. $\tilde{u}_1$ is the recognizer's top hypothesis. The ASR grammar Ψ denotes the set of all user speech u which the system can recognize. Thus each N-best entry is a member of the grammar $\tilde{u}_n \in \Psi$. The cardinality of the grammar is denoted U=|Ψ|.

The user's speech u can be in the grammar ("ig", u∈Ψ), out of the grammar ("oog", u∉Ψ), or may be silent ("sil", u=0). This "type" is indicated by t(u):

$$t(u) = \begin{cases} ig, & \text{if } u \in \Psi, u \neq 0; \\ oog, & \text{if } u \notin \Psi, u \neq 0; \\ empty, & \text{if } u = 0. \end{cases}$$

The user's speech can appear on the N-best list in position n ("cor(n)", $\tilde{u}_n=u$), can not appear on the N-best list ("inc", u∉ũ, ũ≠0), or the N-best list may be empty ("empty", ũ=0). The system can formalize this as c(ũ, u):

$$c(\tilde{u}, u) = \begin{cases} cor(n), & \text{if } \tilde{u}_n = u, \\ inc, & \text{if } u \notin \tilde{u}, \tilde{u} \neq 0, \\ empty, & \text{if } \tilde{u} = 0. \end{cases}$$

Core probabilities $P_e(c(\tilde{u},u)|t(u))$ describe how often various types of errors are made generally. For example, $P_e$(cor (n)|ig) is the probability that entry n on the N-best list is correct given that the user's speech is in-grammar, and $P_e$(empty|oog) is the probability that the N-best list is empty given that the user's speech is out-of-grammar. Some entries are estimated from data (<given>), and others are derived, as follows:

$P_e(empty|sil)$=<given>

$P_e(inc|sil)$=1−$P_e(empty|sil)$ $P_e(empty|oog)$=<given>

$P_e(inc|oog)$=1−$P_e(empty|oog)$ $P_e(empty|ig)$=<given>

$P_e(cor(n)|ig)$=<given>

$$P_e(inc \mid ig) = 1 - P_e(empty \mid ig) - \sum_{n=1}^{N} P_e(cor(n) \mid ig).$$

$P_e(inc|ig)$ depends on the length of the N-best list in $\tilde{u}$. The system assumes that all pairwise confusions at a given N-best entry n are equally likely because phonetically confusable entries can appear in the N-best list, and so the model implicitly captures confusability.

The system develops the probability of generating a specific N-best list $\tilde{u}$ given u, $P_{\tilde{u}}(\tilde{u}, c(\tilde{u}, u)|u, t(u))$. When the user says something out of grammar, the system generates an N-best list with a probability $P_e(inc|oog)$. Since all confusions are random, the probability of all N-best lists is equal. The probability of the first entry on the N-best list is 1/U because it is chosen at random from U possible entries. The probability of the second entry is 1/(U−1) because the one entry is no longer in the list of possible entries. The probability of the third entry is 1/(U−2) and so on. Each generation is independent and so in general for any N:

$$P_{\tilde{u}}([\tilde{u}_1, \ldots, \tilde{u}_N], inc \mid u, oog) = P_e(inc \mid oog) \frac{1}{U} \cdot \frac{1}{U-1} \cdots \frac{1}{U-(N-1)}$$

$$= P_e(inc \mid oog) \prod_{i=0}^{N-1} \frac{1}{U-i}$$

For convenience $P_b^N$ is defined as $$P_b^N := \prod_{i=0}^{N-1} \frac{1}{U-i}$$

Thus, it follows that $P_{\tilde{u}}([\tilde{u}_1, \ldots, \tilde{u}_N], inc|u, oog) = P_e(inc|oog) P_b^N$ With probability $P_e(empty|oog)$, the system generates no recognition result so $P_{\tilde{u}}([\,], empty|u, oog) = P_e(empty|oog)$ The cases where the user says nothing (t(u)=sil) can be derived in the same way.

As above, when the user says something in grammar with probability $P_e(empty|ig)$ the system does not generate an N-best list. With probability $P_e(inc|ig)$ the system generates an N-best list which does not contain the correct entry. In this case, the probability of the top entry on the list is 1/(U−1) because the entry the user said is not available. The probability of the second entry is 1/(U−2) because the item the user said and the first N-best entry aren't available, and so on. In general:

$$P([\tilde{u}_1, \ldots, \tilde{u}_N], inc \mid u, ig) = P_e(inc \mid ig) \frac{1}{U-1} \cdot \frac{1}{U-2} \cdots \frac{1}{U-N}$$

$$= P_e(inc \mid ig) \frac{1}{U-N} \frac{1}{\frac{1}{U}} \prod_{i=0}^{N-1} \frac{1}{U-i}$$

For convenience $P_u^i$ is defined as $$P_u^i := \frac{1}{U-i}.$$

Thus $$P([\tilde{u}_1, \ldots, \tilde{u}_N], inc \mid u, ig) = P_e(inc \mid ig) \frac{P_u^N}{P_u^0} P_b^N$$

With probability $P_e(cor(1)|ig)$ the N-best list contains the correct entry in the first position. Since all confusions are equally likely, the probability of the second entry is 1/(U−1) because 1 entry is no longer available. The probability of the third entry is 1/(U−2), and so on. Each generation is independent. In general for any n and N:

$$P_{\tilde{u}}([\tilde{u}_1, \ldots, \tilde{u}_N], cor(n) \mid u, ig) = P_e(cor(n) \mid ig) \frac{1}{U-1} \cdot \frac{1}{U-2} \cdots \frac{1}{U-(N-1)}$$

$$= P_e(cor(n) \mid ig) \prod_{i=1}^{N-1} \frac{1}{U-i}$$

$$= P_e(cor(n) \mid ig) \frac{1}{\frac{1}{U}} \prod_{i=0}^{N-1} \frac{1}{U-i}$$

$$= P_e(cor(n) \mid ig) \frac{1}{P_u^0} P_b^N$$

In addition to the content of the N-best list $\tilde{u}$, the recognition result also includes the set of recognition features f. To model these the system defines a probability density of the recognition features f given $c(\tilde{u}, u)$ and $t(u)$ as $p(f|c(\tilde{u}, u), t(u))$.

The full model $p(\tilde{u}, f|u)$ can be stated:

$$p(\tilde{u}, f \mid u) = p(\tilde{u}, f, c(\tilde{u}, u) \mid u, t(u))$$

$$= P_{\tilde{u}}(\tilde{u}, c(\tilde{u}, u) \mid u, t(u)) p(f \mid \tilde{u}, c(\tilde{u}, u), u, t(u))$$

$$= P_{\tilde{u}}(\tilde{u}, c(\tilde{u}, u) \mid u, t(u)) p(f \mid c(\tilde{u}, u), t(u))$$

During one belief state update, the system can fix the recognition result to normalize a summation over u, as discussed above where η is a normalizing constant. As a result, the system can group empty and non-empty recognition results together and divide out common factors from within each group. So, for the empty N-best lists ($c(\tilde{u}, u)$=empty):

$p(\tilde{u}, f, empty|u, ig) = P_{\tilde{u}}(empty|ig) p(f|empty, ig)$ $p(\tilde{u}, f, empty|u, oog) = P_{\tilde{u}}(empty|oog) p(f|empty, oog)$ $p(\tilde{u}, f, empty|u, sil) = P_{\tilde{u}}(empty|sil) p(f|empty, sil)$ The factor $P_b^N$ is common to all $P_{\tilde{u}}$ in non-empty N-best lists and can be divided out. This yields a quantity $\tilde{p}$ which is in constant linear proportion to p for a fixed N-best list.

$$\tilde{p}(\tilde{u}, f, cor(n) | u, ig) = P_{\tilde{u}}(cor(n) | ig) \frac{1}{P_u^0} p(f | cor(n), ig)$$

$$\tilde{p}(\tilde{u}, f, inc | u, ig) = P_{\tilde{u}}(inc | ig) \frac{P_u^N}{P_u^0} p(f | inc, ig)$$

$$\tilde{p}(\tilde{u},f,inc|u,oog)=P_{\tilde{u}}(inc|oog)p(f|inc,oog)$$

$$\tilde{p}(\tilde{u},f,inc|u,sil)=P_{\tilde{u}}(inc|sil)p(f|inc,sil)$$

Testing for this model involved applying the model to dialogs collected with a voice dialer. A voice dialer is a particularly well suited application because name recognition is difficult and often calls contain more than one name recognition attempt which is one place to apply the principles described herein to improve dialog accuracy. All of the name recognition attempts were gathered from the dialer's logs and divided into two sets: calls which contained one attempt at name recognition (1224 calls) and calls which contained two or more attempts at name recognition (479 calls). Utterances from the one-attempt calls were used to train the models, and utterances from the multi-attempt calls were used for system evaluation.

The accuracy statistics ($P_e$) estimated from the training and testing corpora are shown below. In the training set, when the caller's speech is in-grammar, the correct answer appears on the top of the N-best list 82.5% of the time, and further down the NBest list 8.5% of the time. This indicates the value of modeling the entire N-best list, not merely the top. Also, the overall accuracy in the test set is much worse than the training set. This is a consequence of the dataset partitioning because the dialogs in the test set included two or more turns and are symptomatic of poorer recognition accuracy.

| $P_e(c(\tilde{u}, u)|t(u))$ | Training set | Test Set |
|---|---|---|
| $P_e(cor(n = 1)|ig)$ | 82.5% | 60.8% |
| $P_e(cor(n \geq 2)|ig)$ | 8.5% | 13.6% |
| $P_e(inc|ig)$ | 9.0% | 25.6% |
| $P_e(empty|ig)$ | 0.0% | 0.0% |
| $P_e(ing|oog)$ | 100% | 100% |
| $P_e(empty|oog)$ | 0.0% | 0.0% |
| $P_e(inc|sil)$ | 31.8% | 14.3% |
| $P_e(empty|sil)$ | 68.2% | 85.7% |

Figure 4:
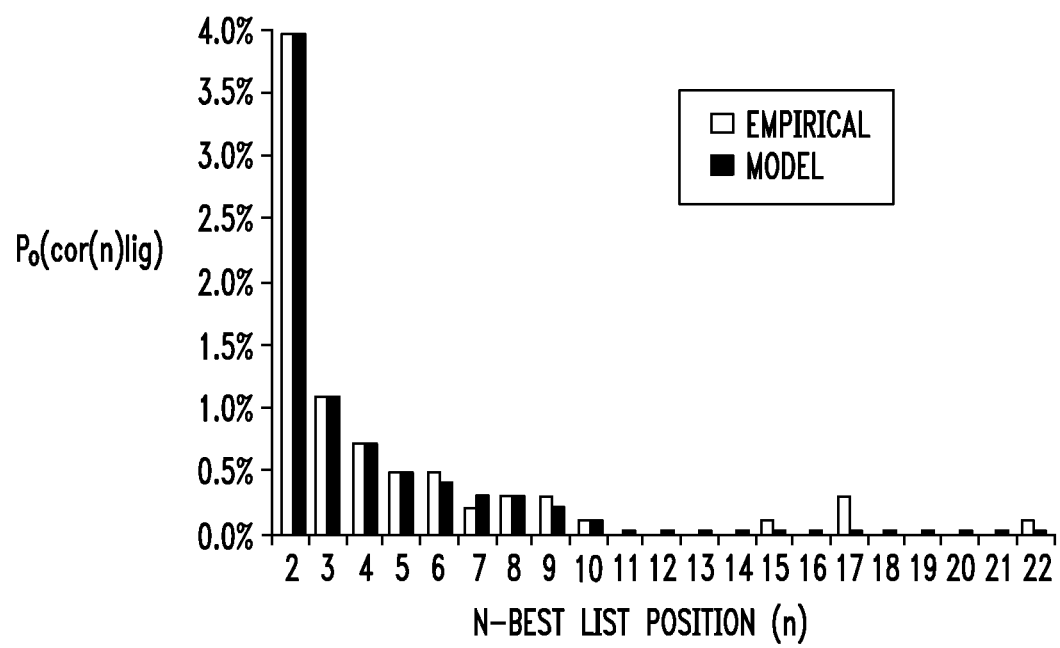
FIG. 4 illustrates N-best accuracy as observed in a training set of data and a smoothed model estimated from the data.

FIG. 4 illustrates N-best accuracy as observed in a training set of data and a smoothed model estimated from the data. Most of the mass is concentrated in the first 10 N-best entries, and many correct entries n>10 are never observed. As a result, the system applies simple smoothing to estimate $P_e(cor(n)|ig)$ from this data, also shown in FIG. 4.

Figure 5:
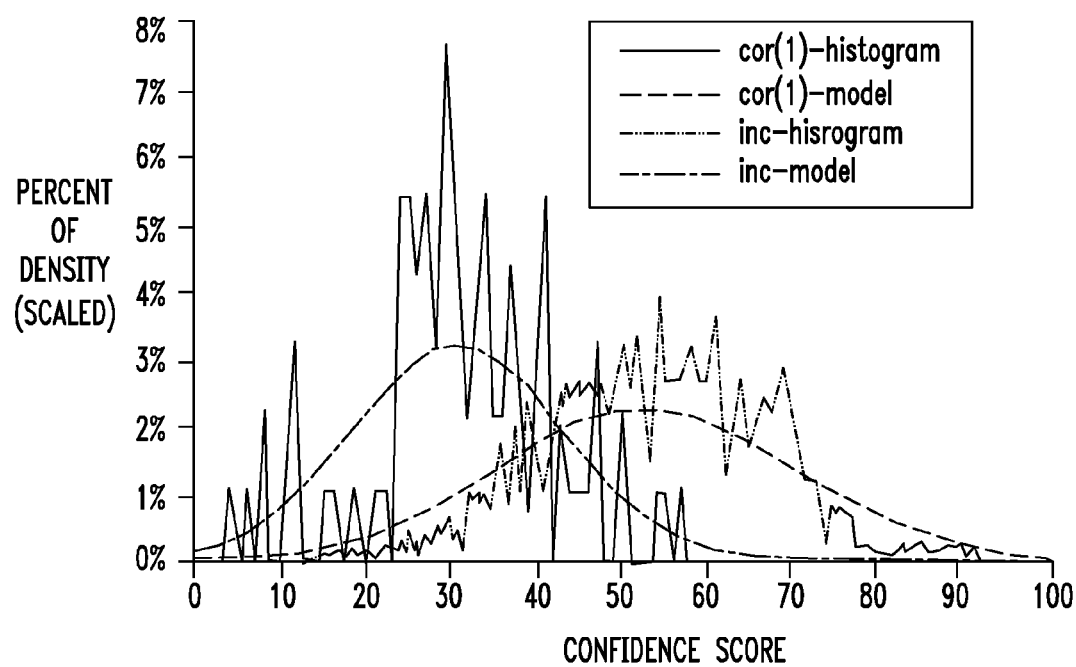
FIG. 5 illustrates a histogram and estimated model for the confidence score of 1-best correct and incorrectly recognized utterances.

For the recognition features, the system uses the ASR confidence score. Empirical plots of the confidence score show that it follows a roughly normal distribution, and so Gaussians were fit to each density of $p(f|c(\tilde{u}, u), t(u))$. FIG. 5 illustrates a histogram and estimated model for the confidence score of 1-best correct and incorrectly recognized utterances. FIG. 5 shows two of these densities. Due to data sparsity, only a single density $P_e(cor(n)|ig)$ for $n \geq 2$ was estimated.

Finally, a simple user model $P(u'|s', a)$ was also estimated from the training corpus. Here the dialog state s simply contains the user's goal, the user's desired callee with this particular dataset, and so the dialog state was set to be fixed throughout the conversation, $P(s'|s, a)=\delta(s', s)$.

When speech recognition errors occur, the correct hypothesis is often in the ASR N-best list, yet traditional dialog systems struggle to exploit this information or ignore it all together. By contrast, given a model of how N-best lists are generated, maintaining a distribution over many dialog states allows a speech recognition system to use and synthesize all of the information on the N-best list. The approach disclosed herein estimates the probability of generating a particular N-best list and its features such as confidence score given a true, unobserved user action. This approach estimates of a small set of parameters and a handful of feature densities. Evaluation trained on about a thousand transcribed utterances and evaluated on real dialog data confirms that this approach finds the correct user goal more often than the traditional approach of locally evaluating confidence scores. Further, using the belief state as a measurement of whole-dialog confidence enables the system to identify correct and incorrect hypotheses more accurately than a traditional approach.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied broadly to nearly any ASR application which uses or may use N-best lists. Those skilled in the art will readily recognize various modifications and changes that may be made to the present invention without following the example embodiments and applications illustrated and described herein, and without departing from the true spirit and scope of the present invention.

I claim:

1. A method comprising:
receiving, as part of a spoken dialog with a spoken dialog system, a user utterance;
generating, via a processor, a plurality of recognition hypothesis; and
selecting an underlying user intention based on an analysis of confidence scores, wherein the analysis of confidence scores sums confidence scores over all possible hidden user actions associated with the plurality of recognition hypothesis, wherein the hidden user actions are not observable by the spoken dialog system.

2. The method of claim 1, further comprising:
assigning an individual confidence score to each recognition hypothesis in the plurality of recognition hypothesis.

3. The method of claim 1, wherein confidence scores are operative over a whole dialog.

4. The method of claim 1, wherein the underlying user intention is further based on a probability of a user action.

5. The method of claim 1, wherein the user utterance is received during a dialog turn.

6. The method of claim 1, wherein the all possible hidden user actions form a hidden Markov model.

7. The method of claim 1, further comprising responding to the user utterance based on the underlying user intention.

8. A system comprising:
a processor; and
a computer-readable storage medium having instructions stored which, when executed on the processor, cause the processor to perform operations comprising:
receiving, as part of a spoken dialog with a spoken dialog system, a user utterance;
generating, via a processor, a plurality of recognition hypothesis; and
selecting an underlying user intention based on an analysis of confidence scores, wherein the analysis of confidence scores sums confidence scores over all possible hidden user actions associated with the plurality of recognition hypothesis, wherein the hidden user actions are not observable by the spoken dialog system.

9. The system of claim 8, the computer-readable storage medium having additional instructions stored which, when executed by the processor, result in operations comprising:
assigning an individual confidence score to each recognition hypothesis in the plurality of recognition hypothesis.

10. The system of claim 9, wherein confidence scores are operative over a whole dialog.

11. The system of claim 9, wherein the underlying user intention is further based on a probability of a user action.

12. The system of claim 9, wherein the user utterance is received during a dialog turn.

13. The system of claim 9, wherein the all possible hidden user actions form a hidden Markov model.

14. The system of claim 9, the computer-readable storage medium having additional instructions stored which, when executed by the processor, result in operations comprising responding to the user utterance based on the underlying user intention.

15. A non-transitory computer-readable storage device having instructions stored which, when executed on a computing device, cause the computing device to perform operations comprising:
receiving, as part of a spoken dialog with a spoken dialog system, a user utterance;
generating, via a processor, a plurality of recognition hypothesis; and
selecting an underlying user intention based on an analysis of confidence scores, wherein the analysis of confidence scores sums confidence scores over all possible hidden user actions associated with the plurality of recognition hypothesis, wherein the hidden user actions are not observable by the spoken dialog system.

16. The non-transitory computer-readable storage device of claim 15, having additional comprising:
assigning an individual confidence score to each recognition hypothesis in the plurality of recognition hypothesis.

17. The non-transitory computer-readable storage device of claim 15, wherein confidence scores are operative over a whole dialog.

18. The non-transitory computer-readable storage device of claim 15, wherein the underlying user intention is further based on a probability of a user action.

19. The non-transitory computer-readable storage device of claim 15, wherein the user utterance is received during a dialog turn.

20. The non-transitory computer-readable storage device of claim 15, wherein the all possible hidden user actions form a hidden Markov model.

* * * * *